US011298707B2

(12) United States Patent
Beukert et al.

(10) Patent No.: US 11,298,707 B2
(45) Date of Patent: Apr. 12, 2022

(54) METHOD AND DEVICE FOR MONITORING THE ROTATIONAL SPEED OF AN ELEMENT

(71) Applicant: Eppendorf AG, Hamburg (DE)

(72) Inventors: Uwe Beukert, Elsteraue (DE); Thomas Sporn, Leipzig (DE)

(73) Assignee: Eppendorf AG, Hamburg (DE)

( * ) Notice: Subject to any disclaimer, the term of this patent is extended or adjusted under 35 U.S.C. 154(b) by 517 days.

(21) Appl. No.: 16/253,567

(22) Filed: Jan. 22, 2019

(65) Prior Publication Data
US 2019/0224692 A1 Jul. 25, 2019

(30) Foreign Application Priority Data
Jan. 23, 2018 (DE) ..................... 10 2018 101 457.0

(51) Int. Cl.
*B04B 9/10* (2006.01)
*B04B 9/02* (2006.01)
*B04B 13/00* (2006.01)
*H02P 6/16* (2016.01)
*H02H 7/093* (2006.01)

(52) U.S. Cl.
CPC ................. *B04B 9/10* (2013.01); *B04B 9/02* (2013.01); *B04B 13/00* (2013.01); *H02P 6/16* (2013.01); *B04B 2013/006* (2013.01); *H02H 7/093* (2013.01)

(58) Field of Classification Search
CPC .. B04B 9/10; B04B 9/02; B04B 13/00; B04B 2013/006; B04B 5/04; H02P 6/16; H02H 7/093; G01P 3/481; G01P 3/487; G01N 1/38

USPC ............ 377/16, 39; 318/314, 327; 340/671, 340/658; 494/7, 10; 324/161, 166; 327/20

See application file for complete search history.

(56) References Cited

U.S. PATENT DOCUMENTS

| 3,465,326 A | * | 9/1969 | Weir ....................... G01P 1/106 340/671 |
| 4,475,105 A | | 10/1984 | Kurosawa |
| 4,521,894 A | * | 6/1985 | Moffat ................... H02H 7/093 377/16 |
| 4,700,117 A | * | 10/1987 | Giebeler ................ B04B 9/146 318/811 |

(Continued)

FOREIGN PATENT DOCUMENTS

| CN | 101038295 A | 9/2007 |
| CN | 101206161 A | 6/2008 |

(Continued)

*Primary Examiner* — Walter D. Griffin
*Assistant Examiner* — Shuyi S. Liu
(74) *Attorney, Agent, or Firm* — Smartpat PLC

(57) ABSTRACT

A method and a device for monitoring the rotational speed of an element are disclosed. The element may be part of a centrifuge, e.g. a motor, drive shaft, or rotor of a laboratory centrifuge. The rotational speed of the element is not determined directly, but rather clock cycles are counted while the element rotates by a predetermined rotational angle. Exceeding a predetermined rotational speed is determined by comparing a number of counted cycles with a predetermined value. The method and device can be implemented in hardware without requiring a microcontroller with corresponding software, thereby eliminating a need to software certification.

18 Claims, 3 Drawing Sheets

(56) References Cited

U.S. PATENT DOCUMENTS

| | | | |
|---|---|---|---|
| 5,103,213 A | 4/1992 | Marsh et al. | |
| 5,726,881 A | 3/1998 | Inaniwa et al. | |
| 6,262,549 B1 * | 7/2001 | Yang | G01P 3/481 |
| | | | 318/463 |

FOREIGN PATENT DOCUMENTS

| | | |
|---|---|---|
| CN | 101726625 A | 6/2010 |
| CN | 103675322 A | 3/2014 |
| DE | 1523194 A1 | 1/1971 |
| DE | 2254250 C3 | 6/1980 |
| DE | 2942891 A1 | 5/1981 |
| DE | 19632965 A1 | 2/1998 |
| JP | S60851 A | 1/1985 |
| JP | S63105865 U | 7/1988 |
| JP | S63176561 U | 11/1988 |
| JP | H0257650 B2 | 12/1990 |
| JP | H08108098 A | 4/1996 |
| JP | 2015123432 A | 7/2015 |

* cited by examiner

METHOD AND DEVICE FOR MONITORING THE ROTATIONAL SPEED OF AN ELEMENT

TECHNICAL FIELD

The disclosure relates to a method and a device for monitoring the rotational speed of an element, in particular the motor, drive shaft or rotor of a laboratory centrifuge, to prevent excessive rotational speeds.

BACKGROUND

Monitoring, especially of motor rotational speeds, can be used in many ways, for example to recognize and prevent safety problems caused by exceeding a maximum rotational speed. Such rotational speed monitoring may be used in centrifuges to prevent crashes. This is particularly important for laboratory centrifuges that are used with centrifuge rotors that have a maximum rotational speed.

Centrifuge rotors are used in centrifuges, in particular laboratory centrifuges, to separate components of samples centrifuged therein by exploiting mass inertia. In doing so, increasingly higher rotational speeds are used to achieve high segregation rates. Laboratory centrifuges are centrifuges whose rotors preferably operate with at least 3,000, preferably at least 10,000, in particular at least 15,000 revolutions per minute and are usually placed on tables. In order to be able to place them on a worktable, they have a form factor of less than 1 m×1 m×1 m in particular, such that their installation space is limited. Preferably, the device depth is limited to a maximum of 70 cm.

Such centrifuges are used in the fields of medicine, pharmacy, biology, chemistry, and the like.

The samples to be centrifuged are stored in sample containers and these sample containers are rotated by a centrifuge rotor. Thereby, the centrifuge rotors are usually set in rotation by a vertical drive shaft, which is driven by an electric motor. There are various centrifuge rotors that are used depending on the intended application. The sample containers can directly contain samples. Alternatively, the sample containers can include sample receptacles which contain the sample, so that a large number of samples can be centrifuged simultaneously in one sample container. Centrifuge rotors in the form of fixed-angle rotors and swing rotors are generally known.

In most cases, the samples are centrifuged at certain temperatures. For example, samples containing proteins and similar organic substances must not be overheated. The upper limit for the temperature control of such samples is normally in the range of +40° C. On the other hand, certain samples are normally cooled in the range of +4° C. (the anomaly of the water starts at 3.98° C.).

In addition to such predetermined maximum temperatures of approximately +40° C. and standard operating temperatures such as +4° C., other operating temperatures are also provided, such as +11° C., in order to, at such temperature, check whether the cooling unit of the centrifuge runs below room temperature on a controlled basis. On the other hand, for reasons of occupational safety, it is necessary to prevent the touching of elements that have an excessively high temperature of, for example, greater than or equal to +60° C.

In principle, active and passive systems can be used for temperature control. Passive systems are based on air-assisted ventilation. This air is led directly past the centrifuge rotor, by which temperature control takes place. The air is sucked through openings into the centrifuge vessel, and through further openings the heated air is discharged again at another point of the centrifuge vessel, whereas the air is sucked in and discharged automatically by the rotation of the centrifuge rotor. On the other hand, passive cooling is also possible by guiding air past the cooling fins of the centrifuge vessel by means of one or more fans, whereas the centrifuge vessel is formed without ventilation openings.

Active cooling systems, on the other hand, have a refrigerant circuit that regulates the temperature of the centrifuge container, which indirectly cools the centrifuge rotor and the sample containers accommodated in it. Many different media are used as cooling or temperature control media.

Using microcontrollers for the monitoring of rotational speed is generally known. For example, U.S. Pat. No. 4,700,117 A describes the use of magnets and Hall sensors to monitor the rotational speed of a centrifuge rotor in conjunction with a microcontroller.

A disadvantage of such solutions is, that the microcontroller requires software that must be certified. If such software is changed, a new certification is required.

Therefore, the object of the present disclosure is to propose a rotational speed monitoring system that does not require re-certification after a design change, and preferably requires no software certification at all. Also, the monitoring system should be simple and cost-effective.

SUMMARY

This object is accomplished with the method and device as claimed.

The inventors recognized that speed monitoring of a rotating element can be accomplished in a surprisingly simple manner not by determining the rotational speed itself, but by counting clock cycles during a predetermined angular motion of the rotating element and comparing the counted cycles with a predetermined value to detect whether a predetermined rotational speed has been exceeded. More specifically, the counted number of cycles may be compared with a reference value to indicate whether a safe operating speed of the rotating element has been exceeded. A microcontroller with appropriate software is not required. Rather, the method and device can be implemented strictly in hardware. Therefore, no subsequent certifications or re-certifications are required after an appropriate functional test has been performed within the framework of the existing standards.

A method for monitoring the rotational speed of an element, in particular in centrifuges, preferably laboratory centrifuges, determines whether the rotational speed of the element exceeds a predetermined rotational speed of the element. The method includes the following steps:
  generating a clock signal with a defined frequency;
  counting a number of cycles of the clock signal within a period of time during which the element rotates by a predetermined fraction or multiple of one revolution;
  comparing the counted number of cycles with a predetermined counter value; and
  determining that the rotational speed of the element exceeds the predetermined rotational speed when the counted number of cycles falls below the predetermined counter value.

The number of cycles of the clock signal need not be counted for one complete revolution. Rather, it can also be counted for several revolutions or even partial revolutions. For example, several magnets with the same distance around the axis of rotation could be used to detect fractions of a revolution, while only one magnet could be used to detect one revolution. If only every second pass, or multiple passes, of the magnet is detected by means of a selection, multiple revolutions can be detected. Whether fractions or multiples are detected depends on the available cycle frequency and the predetermined rotational speed.

Throughout this specification and the claims the term "multiple" means not only a two (factor of "2") or a multiple, but also the simple factor; i.e., the factor of "1".

The term "clock signal" means any pulsed signal, preferably an electrical pulsed signal.

The "element" can be any rotating part. The element is preferably the drive shaft of a motor. Even if, strictly speaking, this concerns the monitoring of the rotational speed of the drive shaft of a motor, within this specification the term is abbreviated as "monitoring of the rotational speed of a motor." Any element driven by such a motor can also be monitored for its rotational speed.

The predetermined counter value may be proportional to the product of the duration of one revolution at the predetermined rotational speed and the clock frequency and is rounded to a natural number. The predetermined counter value is preferably identical to the product of the duration of one revolution at the predetermined rotational speed and the clock frequency and is rounded to a natural number. In this case, the counter value can be predetermined with particular ease.

Revolution of the element may be sensed electromagnetically, preferably by at least one magnet interacting with a magnetic sensor, in particular a Hall sensor. Thereby, the revolution of the element can be read out with particular ease.

The predetermined rotational speed may be adapted (selectively determined) for the element used and/or for the elements driven by the element, preferably a centrifuge rotor. Thereby, the monitoring can easily be adapted to specific existing needs.

The predetermined rotational speed may be determined and read out on a coded basis. A code may be placed at the element and/or the driven element, whereas it is preferably provided that i) the coding is effected by one or more magnets and the reading out is effected by a Hall sensor or ii) the coding is effected by an RFID transponder and the reading out is effected by an RFID receiver. This allows the specific existing need to be determined particularly easily and automatically.

After falling below the predetermined counter value, the rotational speed of the element may be reduced and the element is preferably decelerated to a standstill. Active deceleration is not necessary; it is possible to simply let the element run down without supplying drive energy. Such passive deceleration is recommended, for example, for centrifuge rotors. Thereby, the limiting of the rotational speed and, preferably, a particular securing against conditions critical to operations are achieved. Although it would also be possible to reduce the rotational speed into the non-critical range, this would involve rotational speed control that would require corresponding software with certification in this respect, which is avoided if the rotational speed is reduced to a standstill.

The predetermined rotational speed of the element may be defined as the maximum rotational speed plus a tolerance, wherein the tolerance is preferably at most 10%, preferably at most 5%, in particular at most 3% of the maximum rotational speed. This takes into account any overshooting of the rotational speed control on the element side that may occur when the element is accelerated.

A device for monitoring the rotational speed of an element, in particular in centrifuges, preferably laboratory centrifuges, may be used to determine whether the rotational speed of an element exceeds a predetermined (safe) rotational speed of the element. The device includes a clock generator which generates a clock signal with a defined frequency. A revolution detector senses rotation of the element by a predetermined fraction or multiple of one revolution. A binary counter is adapted to count a number of cycles of the clock signal during which the element rotates by the predetermined fraction or multiple of one revolution. A comparator is adapted to compare the counted number of cycles with a predetermined counting value. Exceeding of the predetermined rotational speed is detected by the counted number of cycles falling below the predetermined counting value.

In this specification the revolution detector may be referred to as means for determining fractions or multiples of one complete revolution of the element. The binary counter may be referred to as means for counting the cycles within the duration of the fraction or multiples of the complete revolution of the element. The comparator may be referred to as means for comparing the counted cycle with a predetermined counting value.

The clock generator may be a quartz-stabilized clock generator. Thereby, the frequency of the clock can be set very precisely purely in terms of hardware.

A controller (means for controlling the element) may be provided and adapted to reduce the rotational speed of the element if an exceeding of the predetermined rotational speed is detected. Thereby, the monitoring can intervene directly in the element control.

The means for determining fractions or multiples of one complete revolution of the element may be adapted to react only to a rising or falling signal edge and may preferably include a D flip-flop. This compensates for tolerances with respect to the determination of rotation. If, for example, magnets and Hall sensors are used for the determination of rotation, tolerances exist with regard to the magnetic field strength, with regard to the distance between the magnet and the Hall sensor and with regard to the Hall sensor.

The means for counting the cycle within the duration of the fraction or multiples of the complete revolution of the element may be adapted to count within the duration of the fraction or multiples of the complete revolution of the element and not to count within the duration of the next fraction or multiples of the complete revolution of the element. This leaves enough time for evaluation after the cycle count.

The means for counting the cycle within the duration of the fraction or multiples of the complete revolution of the element may comprise a binary counter that is preferably designed at least as a 4-bit binary counter, in particular at least as an 8-bit binary counter. Of course, higher resolutions can also be used, depending on the application. This makes the device particularly simple in design.

The means for comparing the counted cycle with a predetermined counter value may comprise a comparator that is preferably designed at least as a 4-bit binary comparator, in particular at least as an 8-bit comparator. This makes the device particularly simple in design.

The means for counting the cycle within the duration of the fraction or multiples of the complete revolution of the element may comprise an overflow memory. This prevents that, at very low rotational speeds, an overflow of the cycle counter would result in a cycle number that is too low when the cycle counter is read out, which would indicate a very high rotational speed, but which is not actually present. In the event of a counter overflow, the overflow memory therefore reliably determines that the rotational speed is not too high, which is sufficient as a result. However, by adding the cycle counter and the overflow memory, the actual number of cycles counted could also be determined.

Means for resetting may be provided, which preferably reset the means for counting the cycle, the means for comparing the counted cycle and/or the overflow memory. This allows continuous monitoring.

A results memory may be provided for the state of an element rotational speed that is exceeded with respect to the predetermined rotational speed, which results memory is preferably adapted to store the state of the element rotational speed that is exceeded until the element comes to a standstill or reaches an uncritical peripheral speed of preferably less than 3 m/s, most preferably less than 2 m/s, whereas the results memory is in particular adapted to be erased through an opening of a cover of the centrifuge. Thereby, critical safety conditions can be avoided.

A centrifuge may utilize the rotational speed monitoring system to prevent excessive and potentially dangerous rotational rotor speeds. The centrifuge may in particular be a laboratory centrifuge.

The characteristics and other advantages of this invention are illustrated in the following on the basis of the description of a preferential embodiment in connection with the figures.

DETAILED DESCRIPTION

Figure 1:
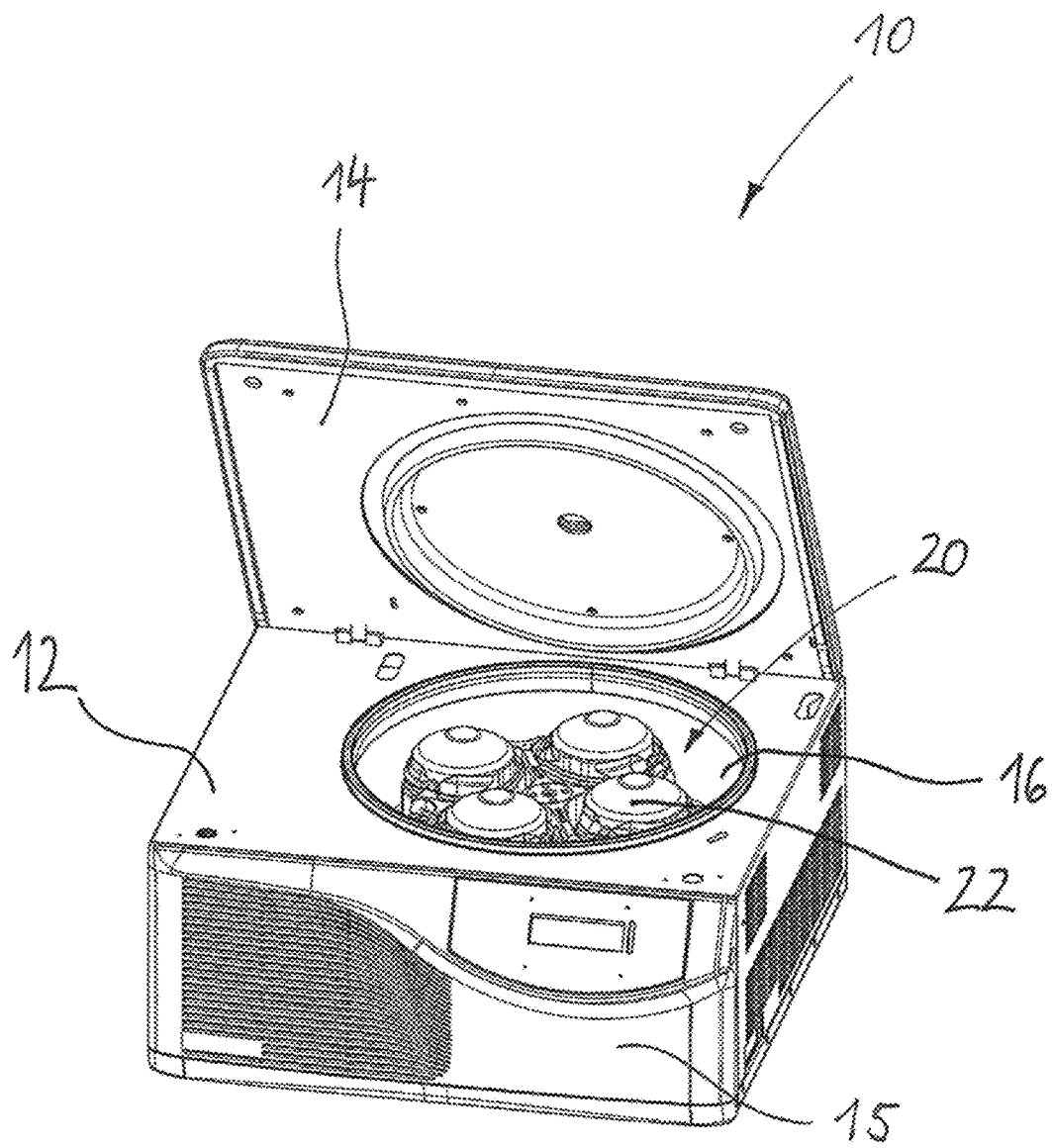
FIG. 1 illustrates a laboratory centrifuge which implements a method for monitoring rotational speed.

FIGS. 1 to 4 show, schematically, a laboratory centrifuge 10 and a device 100 used therewith for rotational speed monitoring.

The centrifuge 10 is formed as a laboratory centrifuge with a housing 12, a cover 14, and an operating front 15. In a centrifuge container 16 of the centrifuge 10, a centrifuge rotor 20 is arranged on a drive shaft 17 of a centrifuge motor 18. The centrifuge rotor is formed as a swing rotor with centrifuge beakers 22.

The "element" here is the centrifuge motor 18 or more precisely the drive shaft 17 of the centrifuge motor 18. The "element control" is the corresponding motor control (not shown) and the element "driven" by the element is the centrifuge rotor 20.

A permanent magnet 24, which is assigned a fixed Hall sensor 26, is arranged on the drive shaft 17.

Furthermore, a second permanent magnet 28, which in turn is assigned a second fixed Hall sensor 30, is arranged on the centrifuge rotor 20. Alternatively, the second permanent magnet 28 could be replaced by an RFID transponder (not shown) and the second Hall sensor 30 could be replaced by an RFID receiver (not shown). Other suitable coding means, such as barcode scanners and the like, could also be used.

Figure 2:
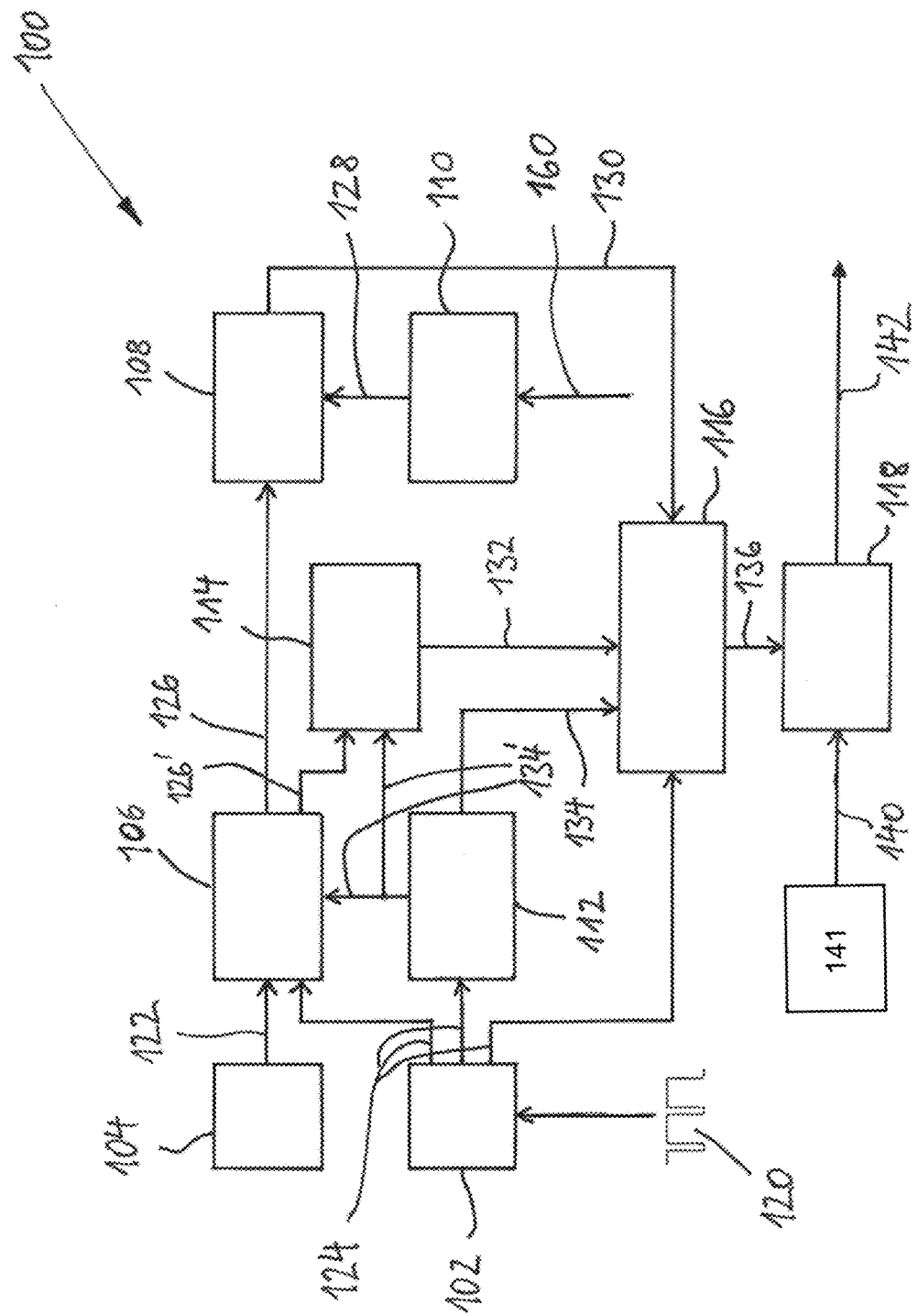
FIG. 2 shows a block diagram of a device for monitoring rotational speed of an element.
Figure 3:
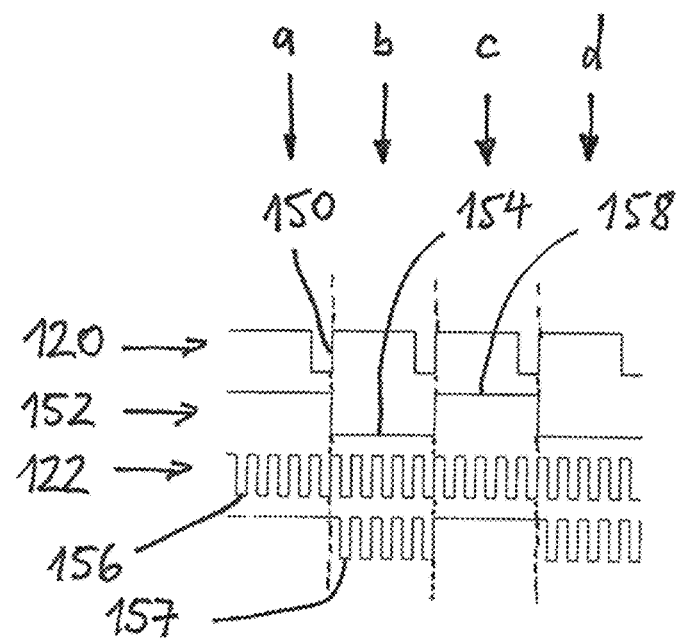
FIG. 3 is a diagram illustrating a cycle count within a method and device for monitoring rotational speed of an element.
Figure 4:
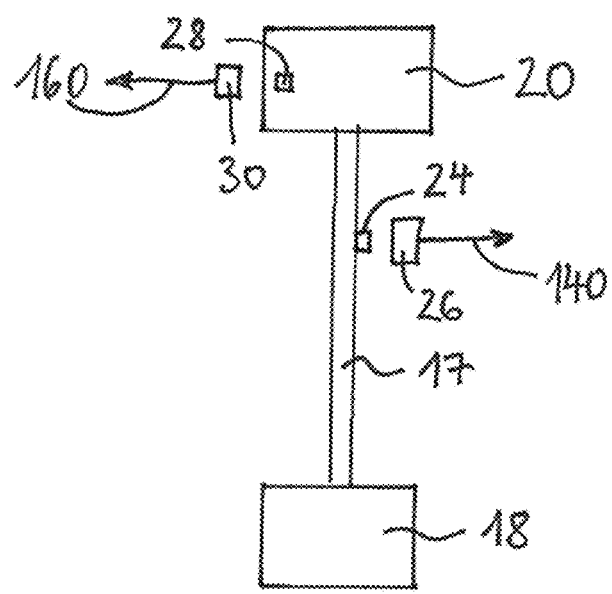
FIG. 4 illustrates a revolution detector and rotational speed release.

The device 100 for monitoring the rotational speed of the centrifuge motor 18 or the drive shaft 17 of the centrifuge motor 18 is shown more specifically in FIGS. 2 to 4.

As shown, the device 100 has a revolution detector 102, a clock generator 104, a binary counter 106, a comparator 108, a reference value transmitter 110, a sequence controller 112, an overflow memory 114, an evaluator 116 and a results memory 118.

The revolution detector 102 includes a D flip-flop (not shown). It receives its input signal 120 from the Hall sensor 26, which is assigned to the permanent magnet 24 arranged on the drive shaft 17.

The clock generator is quartz-stabilized and has a basic clock cycle with a frequency of 32.768 kHz. This is halved, by which the clock generator 104 outputs an electrical pulse 122 with a frequency of 16.384 kHz.

The binary counter 106, the comparator 108, and the reference value transmitter 110 are each 8-bit elements with a number range of 255.

The revolution detector 102 transmits its output signal 124 at the same time to the binary counter 106, the sequence controller 112 and the evaluator 116. The binary counter 106 transmits an output signal 126 to the comparator 108 and, if necessary, transmits a second output signal 126' to the overflow memory 114. The comparator 108 receives a reference value 128 from the reference value transmitter 110. The comparator 108 transmits its output signal 130 to the evaluator 116. Furthermore, the evaluator 116 receives the output signal 132 from the overflow memory 114 and the output signal 134 from the sequence controller 112. The sequence controller 112 also transmits control signals 134' to the binary counter 106 and the overflow memory 114. The evaluator 116 feeds its output signal 136 (result) to the results memory 118, which additionally receives a control signal 140 from a status detector 141 of the centrifuge cover 14. The results memory 118, in turn, transmits a control signal 142 to the motor control (not shown) of the centrifuge motor 18.

The device 100 now works as follows: The Hall sensor 26 detects the respective revolutions of the permanent magnet 24 around the drive shaft 17 and outputs a corresponding signal 120, which is processed by the revolution detector 102. (FIG. 3 shows four revolutions a, b, c, d for illustration.) Therein, the D flip-flop existing in the revolution detector 102 reacts only to the rising edges 150 and at the same time a signal change occurs after each new rising edge 150, such that a square wave signal 152, which has half the frequency with respect to the rising edges 150, is output.

Such measures have the following advantages: The magnetic field strength, the distance between permanent magnet 24 and the Hall sensor 26, and also the Hall sensor 26 itself, are subject to tolerances, which can result in different duty cycles of the rotational speed. However, since the time for one revolution must be set very precisely, such fluctuations would lead to a large deviation. By halving the cycle frequency 120 with a D flip-flop, which reacts only to a rising edge 150, all of the aforementioned tolerances are not applicable, since the measurement is no longer dependent on the duty cycle of the rotational speed. The half cycle frequency 152 with a duty cycle of exactly 50% is thus obtained, by which the rotational speed can be monitored very precisely.

This halved cycle frequency 152 is fed to the binary counter 106, together with the clock signal 122 of the clock generator 104, as an output signal 124. The binary counter 106 now counts the incoming cycles 157 of the clock signal 122 while the halved cycle frequency 152 assumes a low level 154.

Since the number range of the binary counter 106 is limited to the counting of 255 cycles 157, an overflow memory 114 is provided. This ensures that the overflowing number can also be counted for greater incoming cycle counts. As soon as the halved cycle frequency 152 carries a high level 158, the binary counter 106 stops counting. The result 126 of binary counter 106 is transferred to comparator 108.

The comparator 108 receives a reference value 128 from the reference value transmitter 110. The reference value transmitter 110, in turn, keeps available various reference values 128, such as "158" and "64". The corresponding reference value 128 is selected using the control signal 160, which the reference value transmitter 110 receives in this embodiment using the Hall sensor 30 (a separate circuit, which need not be described in detail, is used for this), which is assigned to the permanent magnet 28. If a permanent magnet 28 is not present on the centrifuge rotor 20, the reference value transmitter 110 receives a low level and thereby outputs the reference value 128 of "158" to the comparator 108. If a permanent magnet 28 is present on the centrifuge rotor 20, the reference value transmitter 110 receives a high level and thereby outputs the reference value 128 of "64" to the comparator 108. Thereby, the device 100 receives the release for an increased rotational speed of the centrifuge rotor 20.

Instead of coding the release via one or no magnet 28, one or three magnets 28 or any other combination of magnets can also be used. Other codings, such as RFID transponders or bar codes or the like, are also possible.

The evaluator 116 reacts to the high level 158 of the output signal 124 of the revolution detector 102 and a high level in the control signal 134 of the sequence controller 112, and then starts the evaluation if each of the two signals 124, 134 has a high level. In doing so, a protective measure within the framework of electromagnetic compatibility (EMC) is realized. During the evaluation process, evaluator 116 retrieves the signal 130 of the comparator 108 and the signal 132 of the overflow memory 114, and evaluates whether the comparator 108 indicates that the counter value 126 of the binary counter 106 is greater than or equal to the reference value 128 or not, and whether an overflow occurred.

If the counter value 126 had been greater than or equal to the reference value 128, the evaluator 116 determines that the rotational speed had not been too high. Even if the counter value 126 had been less than the reference value 128, but an overflow 132 occurred, the rotational speed had not been too high, because the overflow memory 114 then represents the counter value 255, which in any case is greater than one of the two reference values 128.

However, if the counter value 126 had been less than the reference value 128 and no overflow 132 occurred, the rotational speed had been too high.

Depending on the result, the evaluator 116 now transmits a control signal 136 to the results memory 118, in such a manner that the results memory 118 outputs a low level in the control signal 142 if the rotational speed had not been too high and a high level if the rotational speed had been too high. Thereby, the results memory 118 is designed in such a manner that it can be overwritten from a low level to a high level, but not vice versa. The high level is deleted exclusively by a corresponding control signal 140 of the status detector of the centrifuge cover 14; that is if such status detector detects an open cover 14. Therein, the cover can only be opened if the centrifuge motor 18 has come to a standstill. However, it could also be provided that an overwriting occurs when the peripheral speed of the centrifuge rotor drops below 2 m/s; however, coupling with the cover opening is preferred.

The output signal 142 of the results memory 118 is entered, directly and with priority, into the motor control, such that it is able to freely regulate with a low level of the output signal 142, and a reduction of the motor rotational speed up to a standstill takes place automatically at a high level of the output signal 142.

The sequence controller 112 reacts to the high level 158 of the output signal 124 of the revolution detector 102 and transmits a time-delayed control signal 134' to both the binary counter 106 and the overflow memory 114, whereas the time shift is determined in such a manner that the readout of overflow memory 114 and the comparator 108 along with the evaluation process in the evaluator 116 with the result 136 and its transmission to the results memory 118 are completed. After this time delay has elapsed, the binary counter 106 and the overflow memory 114 are reset by the sequence controller 112, which thus acts as a resetting device in this connection, by which the next count can be undertaken when the next low level 154 arrives in the control signal 124 and the subsequent evaluation can be undertaken when the next high level 158 arrives.

So that the monitoring with the overflow functions, the reference values 128 in conjunction with the number ranges of the binary counter 106 and the comparator 108 must therefore be set such that the reference values 128 are contained in such number ranges.

In doing so, the reference values 128 in conjunction with the clock frequency 122 are selected in such a manner that they correspond to the desired limiting speeds.

For example, the reference value 128 of "158" corresponds to a limiting speed of 6,223 revolutions per minute, whereas such value was calculated with non-rounded numerical values while taking into account tolerances in the clock signal 122. Simply put, a cycle frequency of 16.384 kHz lasts approximately 0.061 ms, which means that 158 cycles last approximately 9.638 ms. Thus, within this time, one complete revolution of the drive shaft 17 of the motor 18 is carried out, by which one revolution takes place in 9.638 ms, which corresponds to approximately 6,223 revolutions per minute.

Such limiting speed of 6,223 revolutions per minute is approximately 3.7% above a desired maximum rotational speed of 6,000 revolutions per minute, since a slight overshooting is always to be expected upon the acceleration of the motor 18.

The reference value 128 of "64" in turn corresponds to a limiting speed of 15,361 revolutions per minute. Such limiting speed of 15,361 revolutions per minute is also approximately 2% above a desired maximum rotational speed of 15,060 revolutions per minute, since a slight overshooting is always to be expected upon the acceleration of the motor 18.

This shows that, during one revolution of the motor 18, the counting takes place and, during the immediately following revolution of the motor 18, the evaluation takes place, such that these two process steps do not interfere with each other.

It has become clear from the above presentation that a centrifuge 10 with a rotational speed monitoring system 100, with which certification or re-certification within the scope of the monitoring of rotational speed is no longer required.

This is achieved in that the rotational speed itself is not determined; rather, a predetermined cycle is counted in relation to the rotational speed and the exceeding of a predetermined rotational speed is determined by comparing the counted cycle with a predetermined value. This means that a microcontroller with corresponding software is not required; rather, a pure hardware solution can be selected, such that a certification or re-certification is not required.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A method for monitoring a rotational speed of an element and detecting when the rotational speed of the element exceeds a predetermined rotational speed, comprising:
   generating a clock signal with a defined frequency;
   counting a number of cycles of the clock signal within a period of time during which the element rotates by a predetermined fraction or multiple of one revolution;
   comparing the counted number of cycles with a predetermined counter value;
   determining that the rotational speed of the element exceeds the predetermined rotational speed when the counted number of cycles falls below the predetermined counter value;
   reducing the rotational speed of the element when the counted number of cycles falls below the predetermined counter value;
   storing, in a results memory, that the rotational speed of the element has exceeded the predetermined rotational speed; and
   deleting the results memory by a control signal indicating that the element has come to a standstill or has reached a peripheral speed of less than 3 m/s.

2. The method according to claim 1, wherein the predetermined counter value is proportional to a product of the time required for the element to complete one revolution at the predetermined rotational speed and the defined frequency of the clock signal, rounded to a natural number.

3. The method according to claim 1, wherein rotation of the element is sensed electromagnetically by at least one magnet interacting with a magnetic sensor.

4. The method according to claim 1,
   wherein the element is part of a laboratory centrifuge and
   wherein the predetermined rotational speed is adapted for the element.

5. The method according to claim 4, wherein the predetermined rotational speed is encoded on and read out from the element, and wherein
   i) encoding of the predetermined rotational speed is effected by one or more magnets and reading out is effected by a Hall sensor or
   ii) encoding is effected by an RFID transponder and reading out is effected by an RFID receiver.

6. The method according to claim 1, wherein the rotational speed of the element is reduced to a standstill when the counted number of cycles falls below the predetermined counter value.

7. A device for monitoring a rotational speed of an element and detecting when the rotational speed of the element exceeds a predetermined rotational speed, comprising:
   a clock generator which generates a clock signal with a defined frequency,
   a revolution detector which senses rotation of the element by a predetermined fraction or multiple of one revolution;
   a binary counter adapted to count a number of cycles of the clock signal during which the element rotates by the predetermined fraction or multiple of one revolution;
   a comparator adapted to compare the counted number of cycles with a predetermined counting value; and
   a results memory configured to store that the rotational speed of the element has exceeded the predetermined rotational speed, the results memory having an input for a control signal indicating that the element has come to a standstill or has reached a peripheral speed of less than 3 m/s,
   wherein the control signal causes the results memory to be deleted,
   wherein exceeding of the predetermined rotational speed is detected by the counted number of cycles falling below the predetermined counting value, and
   wherein the device reduces the rotational speed of the element when the counted number of cycles falls below the predetermined counting value.

8. The device according to claim 7,
   wherein the clock generator is a quartz-stabilized clock generator and/or
   wherein a controller for controlling the rotational speed of the element is adapted to reduce the rotational speed of the element if an exceeding of the predetermined rotational speed is detected.

9. The device according to claim 7, wherein the revolution detector is operatively connected to a D flip-flop and thereby adapted to react only to a rising or falling signal edge.

10. The device according to claim 7, wherein the binary counter is adapted to count the number of cycles of the clock signal during which the element rotates by the predetermined fraction or multiple of one revolution and not to count during a subsequent time period during which the element rotates by the predetermined fraction or multiple of one revolution.

11. The device according to claim 7, wherein the binary counter is an 8-bit binary counter.

12. The device according to claim 7, wherein the comparator is as an 8-bit comparator.

13. The device according to claim 7, wherein the binary counter comprises an overflow memory.

14. The device according to claim 13, wherein a sequence controller is provided which resets at least one of the binary counter, the comparator, and the overflow memory.

15. The method as in claim 1, wherein the element is a centrifuge rotor with a centrifuge, the method further comprising:
   deleting the results memory in response to a signal indicating that a cover of the centrifuge is open.

16. The method as in claim 1, further comprising:
   transmitting an output signal from the results memory into a motor control.

17. The device according to claim 7,
   wherein an output signal from the results memory is transmitted into a motor control, and wherein the motor control is configured to reduce the rotational speed of the element to a standstill when the output signal is high.

18. A method for preventing excessive rotational speed of a rotor within a centrifuge, comprising:
generating a clock signal with a defined frequency;
counting a number of cycles of the clock signal within a period of time during which the rotor rotates by a predetermined fraction or multiple of one revolution;
comparing the counted number of cycles with a predetermined counter value;
determining that the rotational speed of the rotor exceeds the predetermined rotational speed when the counted number of cycles falls below the predetermined counter value;
storing, in a results memory, that the rotational speed of the rotor has exceeded the predetermined rotational speed;
transmitting a control signal from the results memory to a motor controller while the results memory stores that the rotor has exceeded the predetermined rotational speed;
reducing the speed of the rotor to a standstill in response to the control signal; and
deleting the results memory by a control signal indicating that a cover of the centrifuge has been opened.

* * * * *